United States Patent [19]
Davis

[11] 3,781,059
[45] Dec. 25, 1973

[54] REMOVABLE VEHICLE BODY CLOSURE WITH DUAL USE INSTALLATION

[75] Inventor: William A. Davis, Warren, Mich.

[73] Assignee: General Motors Corporation, Detroit, Mich.

[22] Filed: May 30, 1972

[21] Appl. No.: 257,601

[52] U.S. Cl. .............................. 296/137 B, 296/27
[51] Int. Cl. ............................................ B60j 7/10
[58] Field of Search ..................... 296/99, 137 B, 27

[56] References Cited
UNITED STATES PATENTS
1,924,030  8/1933  Elser ..................................... 296/99
3,378,298  4/1968  Wingen ................................ 296/99

*Primary Examiner*—Robert R. Song
*Attorney*—W. E. Finken et al.

[57] ABSTRACT

A vehicle body has an opening in the rear deck thereof defined by a flange. A closure panel has a peripheral flange. The flange on the body and the flange on the contoured closure panel are symmetrical with respect to a transverse axis therethrough so that the closure panel may be installed on the body in one use position to close the body opening and provide a coupe style body and installed on the body in a second use position upon 180° rotation about the transverse axis to provide a station wagon style body. A compressible seal located between the flanges provides a weathertight joint.

3 Claims, 5 Drawing Figures

PATENTED DEC 25 1973

3,781,059

REMOVABLE VEHICLE BODY CLOSURE WITH DUAL USE INSTALLATION

This invention relates to a removable closure panel for a vehicle body rear deck opening and more particularly to a removable closure panel having a first use position providing a coupe style body and a second use position providing a station wagon style body.

It is known to provide a vehicle body having a pivoted roof structure for a rear opening in the vehicle, which roof structure may be selectively lowered and raised to provide either a sedan or station wagon body style.

It is also known to provide a cover for an opening in the rear deck of a motor vehicle, which cover includes walls having side and back windows and which may be lowered and raised substantially vertical in a track structure to selectively provide a sedan or station wagon body style.

It is well known in automotive vehicles to provide a coupe style body. Such coupe style bodies have less luggage compartment volume than station wagon style bodies. This invention therefore provides a vehicle body which may be converted between a coupe body style and a station wagon body style.

The present invention provides a removable closure panel for a rear deck opening in a vehicle body which is manually removed from the body, rotated 180° about a transverse axis, and reinstalled to effect a change in body styles between coupe and station wagon.

According to a preferred embodiment of the invention, an opening in the rear deck of the vehicle body is defined by a continuous inwardly offset flange extending from the vehicle roof, quarter panels, and the filler panel extending between the quarter panels at their rearward portions. The removable closure panel is preferably of fiber glass construction including integral backlite and sidelites and has a continuous peripheral flange which mates with the flange on the body. The respective flanges are symmetrical about a transverse axis through the center of the deck opening. The closure panel is contoured to provide a coupe style body when installed in one use position in closure of the opening. The closure panel may be removed and manually rotated 180° about a transverse axis and installed in the second use position to provide a station wagon style body. A compressible seal is mounted on the body flange and compressed between the body flange and the closure panel flange when the closure panel is installed, thus providing a weathertight joint. Appropriate releasable latches are provided to secure the removable closure panel to the body.

One feature of the invention is that it provides a removable closure panel for a vehicle body deck opening which may be selectively installed on the body in one use position to provide a coupe style body or installed on the body in a second use position to provide a station wagon style body, the panel being rotatable 180° about a transverse axis between its use positions.

Another feature of the invention is a closure panel for a vehicle body rear deck opening which may be changed between coupe and station wagon body styles manually without the aid of a motor.

Another feature of the invention is an opening in the rear deck of a vehice body defined by a flange which is symmetrical about a transverse axis therethrough and adapted for closure by a removable closure panel having a mating flange so that the panel may be rotated 180° about a transverse axis between coupe and station wagon body styles.

Other features, objects, and advantages of the invention will become apparent upon consideration of the appended specification and drawings in which.

Figure 1:
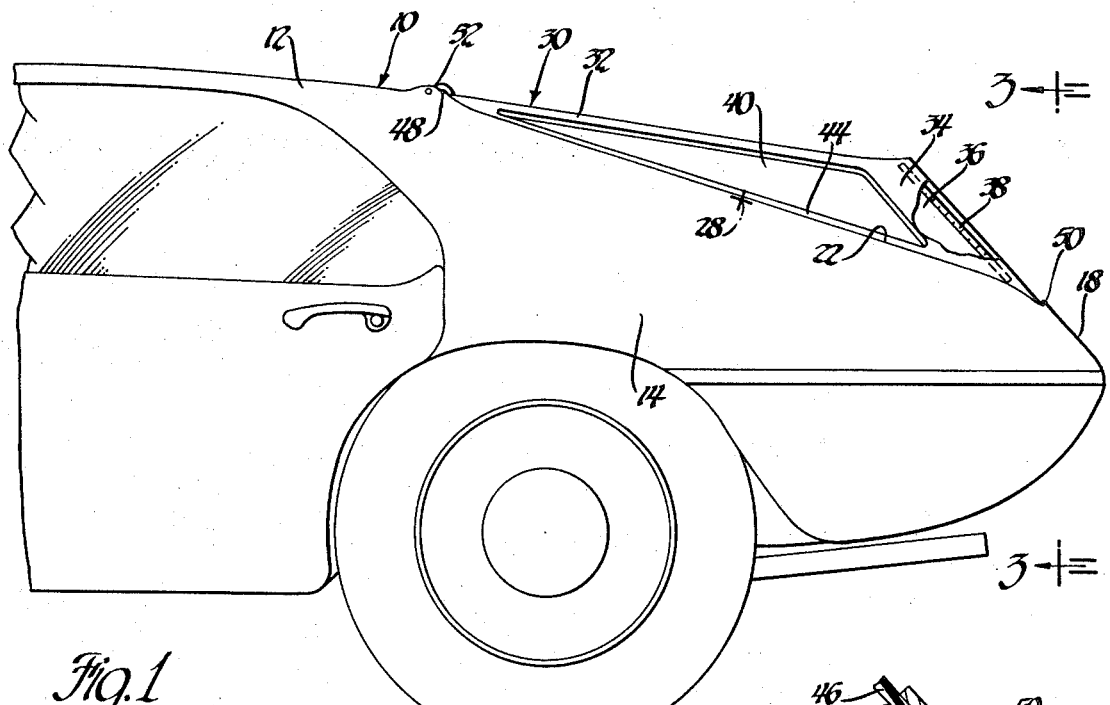
FIG. 1 is a fragmentary side elevation view of a vehicle body embodying the invention with the removable closure panel shown installed in use position providing a station wagon style body.
Figure 4:
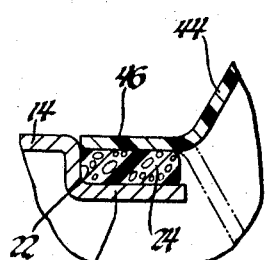
FIG. 4 is a cross-sectional view taken in the direction of arrows 4—4 of FIG. 3.
Figure 2:
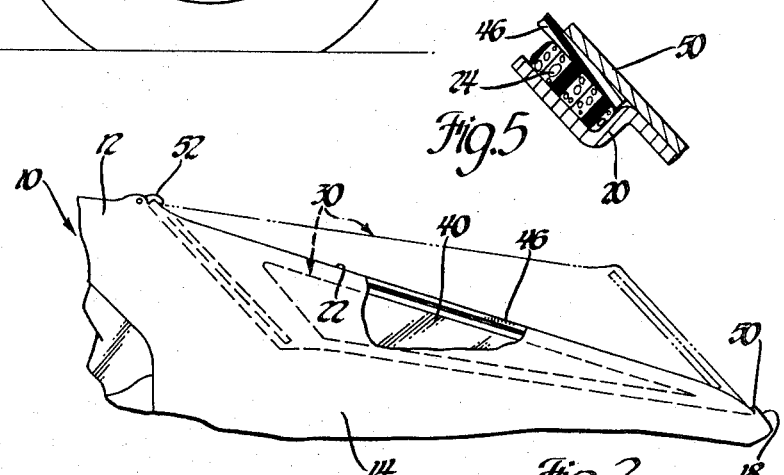
FIG. 2 is a fragmentary side elevation view of a motor vehicle embodying the invention and showing the removable closure panel installed in use position providing a coupe body style.
Figure 3:
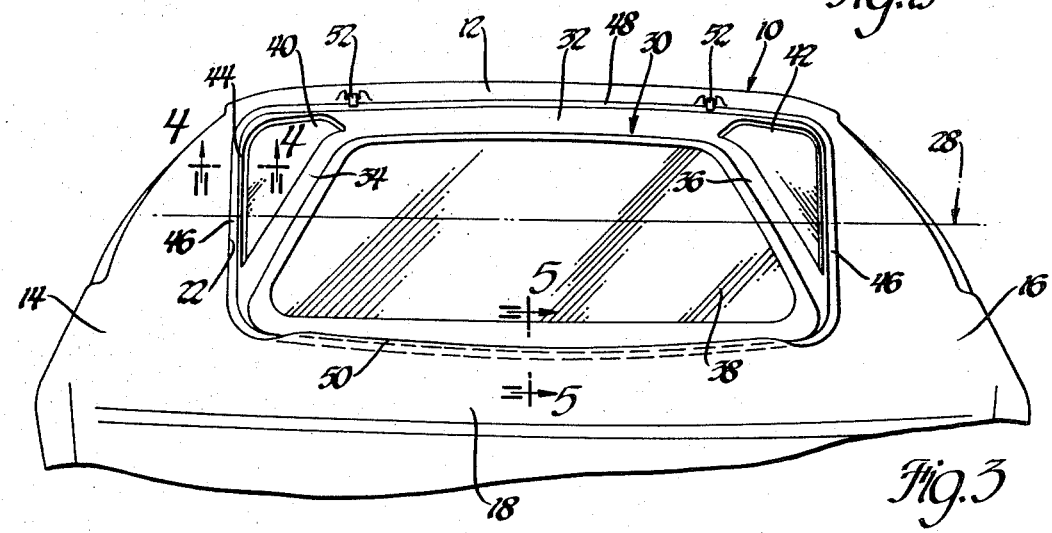
FIG. 3 is a rear elevation view of the vehicle body taken in the direction of arrows 3—3 of FIG. 1.

Referring to FIGS. 1, 2, and 3, a vehicle body is generally indicated at 10. The vehicle body includes a roof structure 12, a left quarter panel 14, a right quarter panel 16, and a filler panel 18 extending transversely between the panels 14 and 16. The roof 12, quarter panels 14 and 16, and rear filler panel 18 include inwardly offset flanges which are joined to each other to provide a continuous inwardly offset flange 20, FIG. 4, which defines an opening 22 in the rear deck of the vehicle body 10. The flange 20 is symmetrical about a transverse axis 28 through the center of the opening 22 defined thereby. A resilient seal 24 of rectangular cross section is mounted on flange 20.

A removable closure panel generally indicated at 30 is provided for closure of the opening 22. The closure panel 30 is preferably of fiber glass or similar plastic construction and includes a deck panel 32, pillars 34 and 36, a backlite 38, sidelites 40 and 42, and a peripheral frame 44 which is joined to panel 32 and pillars 34 and 36. Frame 44 includes an outwardly extending or lateral flange 46, and panel 32 includes a like flange 48. The flanges 46 and 48 are contoured for mating engagement with the seal 24 to provide a weathertight joint. It is thus apparent that the flanges 46 and 48 are also symmetrical about transverse axis 28.

When the closure panel 30 is in the use position of FIG. 1, it provides a station wagon type body style and increases the luggage capacity of the rear portion of the vehicle body 10. In this position, flanges 46 and 48 have their lower surfaces seating on flange 20 as shown in full lines in FIG. 4 and provide a smooth continuation of the roof, quarter panels, and filler panel.

The closure panel 30 may be removed from the vehicle body 10, rotated 180° about a transverse axis and reinstalled as shown in FIG. 2 to provide a coupe body style. In this position of the closure panel, the upper surfaces of flanges 46 and 48 seat on flange 20 as shown in dash lines in FIG. 2. Inasmuch as the flanges 20, 46, and 48 are symmetrical about the transverse axis 28, the closure panel 30 has a weathertight engagement with the seal 24 in either use position.

Figure 5:
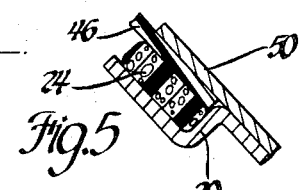
FIG. 5 is a cross-sectional view taken in the direction of arrows 5—5 of FIG. 3.

Appropriate attachment means is provided to secure the removable closure panel 30 to the vehicle body 10. Referring to FIG. 5, such an attachment means may advantageously consist of a lip 50 of the rear filler panel 18 which cooperates with flange 20 to define a recess in which the flange 46 of the closure panel 30 is received. Releasable conventional overcenter type latches 52 are mounted on the roof structure 12 and when engaged hold the flange 48 of the removable closure panel against the compressible seal 22.

Thus it is seen that a removable closure panel is provided for a rear deck opening in a motor vehicle which may be removed and rotated 180° about a transverse axis to convert between coupe and station wagon body styles.

What is claimed is:

1. The combination comprising, a vehicle body having flange means defining an opening in the rear deck thereof, a closure panel having flange means, the flange means on the body and the flange means of the closure panel being symmetrical with respect to a transverse axis through their respective transverse centerlines and being sealingly engageable with one another in one use position in which the closure panel provides a first body style, the flange means of the closure panel being disengageable from the flange means on the body to permit removal of the closure panel, and the flange means of the closure panel being sealingly engageable with the flange means on the body in a second use position subsequent to removal and rotation of the closure panel 180° from the one use position about the transverse axis to provide a second body style.

2. The combination comprising, a vehicle body having a rear deck opening defined by offset inwardly extending flange means symmetrical about a transversely extending axis through the centerline of the opening, a contoured closure panel having peripheral outwardly extending flange means engageable with the offset inwardly extending flange means on the vehicle body, the contoured closure panel being installable in first use position on the body to provide a coupe style body and installable in a second use position upon removal and 180° rotation about a transverse axis to provide a station wagon style body.

3. The combination comprising, a vehicle body having an opening in the rear deck thereof defined by an offset inwardly extending flange symmetrical with respect to a transverse axis through the transverse centerline of the opening, and a closure panel having a peripheral frame and outwardly extending flange means on the peripheral frame symmetrical with respect to a transverse axis therethrough, the closure panel including backlite and sidelites and being contoured to provide a coupe style body when installed in a first use position in closure of of the rear deck opening and a station wagon style body when installed in a second use position subsequent to removal and rotation of the panel 180° about the transverse axis.

* * * * *